UNITED STATES PATENT OFFICE.

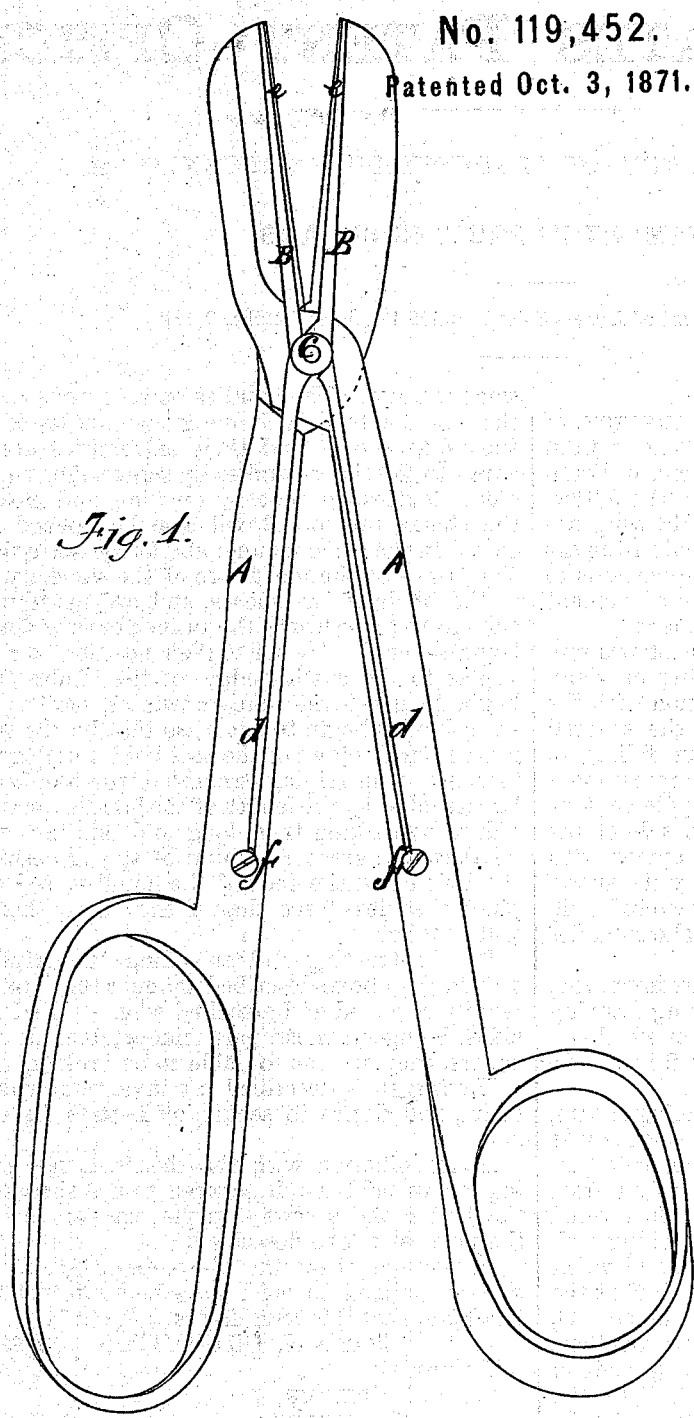
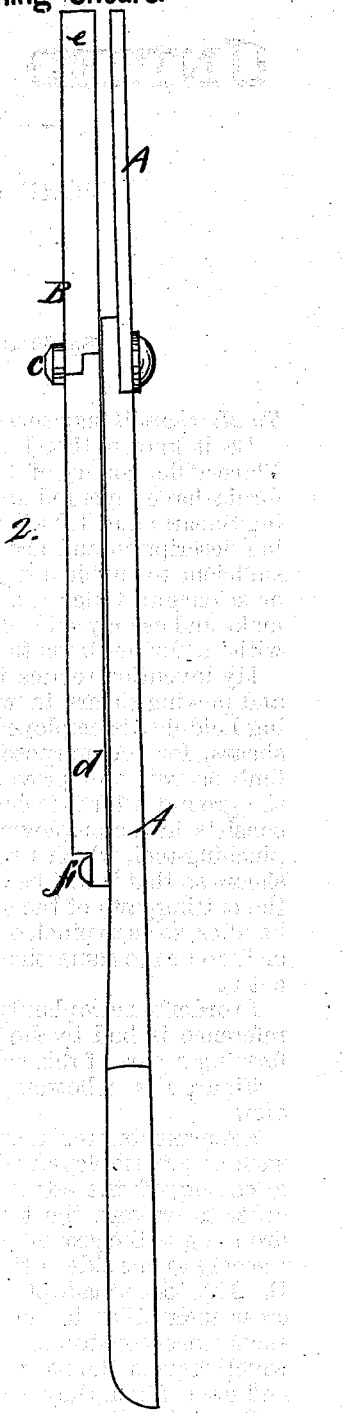

JOHN F. CREIGHTON, OF PLACERVILLE, CALIFORNIA.

IMPROVEMENT IN PRUNING-SHEARS.

Specification forming part of Letters Patent No. 119,452, dated October 3, 1871.

*To all whom it may concern:*

Be it known that I, JOHN F. CREIGHTON, of Placerville, county of El Dorado, State of California, have invented an Improvement in Pruning-Shears; and I do hereby declare the following description and accompanying drawing are sufficient to enable any person skilled in the art or science to which it most nearly appertains to make and use my said invention or improvement without further invention or experiment.

My invention relates to that class of pruning and picking-shears in which a spring or yielding hold-fast is employed in connection with the shears, for the purpose of seizing the severed limb or twig and preventing it from falling to the ground after it is cut off. My improvement consists in the employment of a supplementary pinching-tool, which I secure to one side of the shears so that it will be operated in unison with the cutting-jaws of the shears and by the shear-handles, so as to pinch or grasp the severed twig or limb at the same time that the shear-blades cut it.

In order to more plainly illustrate my invention, reference is had to the accompanying drawing forming a part of this specification, in which—

Figure 1 is a bottom view. Fig. 2 is a side view.

A represents an ordinary pair of pruning-shears, such as are employed for severing small twigs or cutting off the stems of flowers or fruit. In order to prevent the twig, flower, or fruit from dropping to the ground after the stem is severed I secure to one side of the shears a pinching-tool, B. This tool is made of two pieces of metal which cross each other in the same manner that the shears are constructed, and the same bolt, C, which fastens the parts of the shears together, and upon which they open and close, is made of sufficient length to serve also as a bolt for the parts of the tool B to open and close upon in the same manner. The handles or long arms *d d* of the tool B extend back along the handles of the shears, as shown, and their extremities are secured to the shear-handles by screws *f*, or equivalent devices, so that by opening and closing the shears the tool B will also be opened and closed in the same manner and at the same time. The jaws *e* of the tool B are of the same length as the blade of the shears, and are made wide enough to gripe firmly the branch or twig that is being severed. Owing to their position at right angles to the cutting-edges of the blades they begin to grasp the limb or twig as soon as the shear-blades begin to cut it, so that by the time it is cut off the jaws of the tool hold it with great firmness. The griping strength of the tool B can be regulated by the length of the handles or arms *d d*, as by making them long and thin they will be allowed a greater amount of spring between the bolt *c* and the ends of the handles, and will pinch with less force than if they were shorter and heavier.

By constructing and attaching the griping-tool in the above-described manner they can be readily removed and attached when desired, besides, being in most part independent of the shears, they are not so liable to be broken.

Having thus described my invention, what I claim, and desire to secure by Letters Patent, is—

In combination with the shears A, the griping-tool or hold-fast B, secured to the shears by the bolt *c* and screws *f*, in the manner and for the purpose above described.

In testimony that the above-described invention is claimed by me I have hereunto set my hand and seal this 18th day of July, 1871.

JOHN F. CREIGHTON. [L. S.]

Witnesses:
R. P. CULVER,
D. P. DICKINSON.